(12) United States Patent
Horigome

(10) Patent No.: US 7,794,328 B2
(45) Date of Patent: Sep. 14, 2010

(54) GAME SYSTEM, GAME APPARATUS, AND STORAGE MEDIUM STORING GAME PROGRAM

(75) Inventor: Kouki Horigome, Sapporo (JP)

(73) Assignee: Nintendo Co., Ltd., Kyoto (JP)

( * ) Notice: Subject to any disclaimer, the term of this patent is extended or adjusted under 35 U.S.C. 154(b) by 693 days.

(21) Appl. No.: 11/541,683

(22) Filed: Oct. 3, 2006

(65) Prior Publication Data

US 2007/0077991 A1 Apr. 5, 2007

(30) Foreign Application Priority Data

Oct. 4, 2005 (JP) ............................. 2005-291028

(51) Int. Cl.
*A63F 13/00* (2006.01)
(52) U.S. Cl. .............................. 463/42; 463/20; 463/24
(58) Field of Classification Search .................. 463/20, 463/24, 42; 455/436
See application file for complete search history.

(56) References Cited

U.S. PATENT DOCUMENTS

| | | | | |
|---|---|---|---|---|
| 6,811,486 B1 * | 11/2004 | Luciano, Jr. | ................. | 463/24 |
| 2002/0142827 A1 * | 10/2002 | Aida et al. | ..................... | 463/20 |
| 2004/0152517 A1 * | 8/2004 | Hardisty et al. | ............... | 463/42 |
| 2004/0224772 A1 * | 11/2004 | Canessa et al. | ............... | 463/42 |
| 2005/0266851 A1 * | 12/2005 | Kouno | ........................ | 455/436 |

FOREIGN PATENT DOCUMENTS

JP 2004-141225 5/2004

\* cited by examiner

*Primary Examiner*—James S McClellan
*Assistant Examiner*—Ankit Doshi
(74) *Attorney, Agent, or Firm*—Nixon & Vanderhye P.C.

(57) ABSTRACT

A game system includes plural game apparatuses, and the respective game apparatuses are communicably connected to one another. For example, when a communication game is interrupted, a player closes his/her own game apparatus. In such a case, prior to setting of a sleep mode, the game apparatus notifies all other game apparatuses of the interruption of the communication game, and then the game apparatus saves parameters necessary to execute a game main processing program to interrupt the execution of the game main processing program. When the other game apparatuses receive the notification on the interruption of the communication game, the other game apparatuses save the parameters to interrupt the execution of the game main processing program. In resuming the communication game, the respective game apparatuses read the saved parameters to resume the execution of the game main processing program.

21 Claims, 8 Drawing Sheets

GAME SYSTEM, GAME APPARATUS, AND STORAGE MEDIUM STORING GAME PROGRAM

CROSS REFERENCE OF RELATED APPLICATION

The disclosure of Japanese Patent Application No. 2005-291028 is incorporated herein by reference.

BACKGROUND

1. Field of the Technology

The technology presented herein relates to a game system, a game apparatus, and a storage medium storing the game program. More specifically, the present technology relates to a game system, a game apparatus, and a storage medium storing the game program for playing a communication game by two game apparatuses or more having communication functions.

2. Description of the Related Art

An example of the game system in the related art of this sort of technology is disclosed in Japanese Patent Laying-Open No. 2004-141225 [A63F 13/12, H04Q7/38] (document 1) laid-open on May 20, 2004. According to the document 1, when a child machine detects that communication with a parent machine is disconnected, the child machine tries to receive a parent-machine packet broadcast from the parent machine. The child machine receives the parent-machine packet before time out, and the child machine is successful in returning to the communication game when a child-machine number of the child machine itself exists in the parent-machine packet.

In a case where a match-up game is played through wireless communication by three game apparatuses (referred to as X, Y, and Z for the sake of convenience for description) in a general communication game, when a player leaves the game apparatus Z for over a predetermined time to allow the game apparatus Z to be switched to a sleep mode, the communication is automatically disconnected to interrupt the match-up game. Then, even if the game apparatus Z is connected again, it is necessary to start over the match-up game from the beginning, the player of the game apparatus Z causes trouble to players of the game apparatus X and game apparatus Y.

In the related art disclosed in the document 1, in a case where the communication game is played by three game apparatuses (referred to as A, B, and C for the sake of convenience for description), even if the communication with the game apparatus C is disconnected, the communication game proceeds only with the remaining game apparatus A and game apparatus B. Therefore, when the game apparatus C is connected again (returns to the communication game), because the player of the game apparatus C participates in the communication game in the middle of the game having proceeded to some extent, the player of the game apparatus C has large disadvantage.

SUMMARY

Therefore, it is a primary feature of an example embodiment presented herein to provide a novel game system, game apparatus, and storage medium storing the game program.

Another feature of the example embodiment is to provide a game system, a game apparatus, and a storage medium storing the game program, in which the game can be resumed from a time point of interruption.

The example embodiment presented herein adopts the following construction in order to solve the above-described problems. It should be noted that reference numerals and footnote, etc. which are enclosed in parentheses show only one example of correspondences with the embodiment described later in order to help the understandings of the example embodiment, and do not limit the example embodiment.

In a game system according to the example embodiment, a communication game is played by two or more game apparatuses having communication functions. Each of the game apparatuses includes a program executing means, a communication means, a game interruption mode setting means, a game interruption mode notification means, a game interruption processing means, a game interruption mode cancellation means, and a game resumption processing means.

The program executing means executes a game program. The communication means performs communication with another game apparatus. The game interruption mode setting means sets a game interruption mode for interrupting the communication game according to an operation by a player. The game interruption mode notification means notifies another game apparatus of the interruption of the communication game using the communication means, when the game interruption mode is set by the game interruption mode setting means. The game interruption processing means interrupts the execution of the game program, when the communication game is interrupted by the setting of the game interruption mode, or when the notification on the interruption of the communication game is received from another game apparatus by the communication means. The game interruption mode cancellation means cancels the game interruption mode according to the operation of the player. The game interruption mode cancellation notification means notifies another game apparatus of the cancellation of the game interruption mode using the communication means, when the game interruption mode is canceled by the game interruption mode cancellation means. The game resumption processing means resumes the execution of the game program interrupted by the game interruption processing means, when the game interruption mode is canceled by the game interruption mode cancellation means, or when notification on the cancellation of the game interruption mode is received from another game apparatus by the communication means.

Specifically, in the game system (100), the communication game is played by at least two game apparatuses (10) having communication functions. In each game apparatus (10), the program executing means (42) executes the game program (480*a*). The communication means (32, 42, 64) performs the communication with another game apparatus (10). The game interruption mode setting means (42, S15, S17) sets the game interruption mode for interrupting the communication game. The game interruption mode notification means (42, S23) notifies another game apparatus (10) of the interruption of the communication game using the communication means (32, 42, 64), when the game interruption mode is set by the game interruption mode setting means (42, S15, S17). The game interruption processing means (42, S19, S21) interrupts the execution of the game program (480*a*), when the communication game is interrupted by the setting of the game interruption mode, or when the notification on the interruption of the communication game is received from another game apparatus (10) by the communication means (32, 42, 64) ("YES" in S49). The game interruption mode cancellation means (42, S27, S29) cancels the game interruption mode according to the operation by the player. The game interruption mode cancellation notification means (42, S37) notifies another game apparatus (10) of the cancellation of the game interruption mode using the communication means (32, 42, 64), when the game interruption mode is canceled by the game interruption mode cancellation means (42, S27, S29). The game resumption processing means (42, S43, S45, S47) resumes the execution of the game program (480*a*) interrupted by the game interruption processing means (42, S19, S21), when the game interruption mode is canceled by the game interruption mode cancellation means (42, S27, S29), or when notification on the cancellation of the game interruption mode is received from another game apparatus (10) by the communication means (32, 42, 64).

According to the above aspect of the example embodiment, in setting the game interruption mode, each game apparatus interrupts the execution of the game program to notify another game apparatus of the interruption of the game program, so that the communication game is interrupted in another game apparatus. In canceling the game interruption mode, each game apparatus notifies another game apparatus of the canceling of the game interruption mode, and the game interruption mode is canceled in another game apparatus, so that the communication game can be resumed from the time point of the interruption.

In one embodiment, the game interruption processing means automatically interrupts the execution of the game program, when the notification on the interruption of the communication game is received from another game apparatus by the communication means. Specifically, the game interruption processing means (42, S19, S21) automatically interrupts the execution of the game program (480*a*), when the notification on the interruption of the communication game is received from another game apparatus (10) by the communication means (32, 42, 64). Therefore, the players have no trouble, and the communication game never proceeds automatically.

In one aspect of the example embodiment, the game apparatus further comprises a parameter storage means for storing a parameter necessary to execute the game program, the program executing means executes the game program using the parameter stored in the parameter storage means, the parameter storage means retains the parameter when the game interruption mode setting means sets the game interruption mode to interrupt the communication game or when the notification on the interruption of the communication game is received from another game apparatus by the communication means, and the game resumption processing means resumes the game program using the retained parameter. Specifically, each game apparatus (10) further comprises a parameter storage means (28*b*, 48). The parameter storage means (28*b*, 48) stores the parameter (482*b*) necessary to execute the game program (480*a*) or game data. The program executing means (42) executes the game program using the parameter (482*b*) stored in the parameter storage means (28*b*, 48), namely, the program executing means (42) perform a game process. The parameter storage means (28*b*, 48) retains the parameter (482*b*), when the game interruption mode setting means (42, S15, S17) sets the game interruption mode to interrupt the communication game, or when the notification on the interruption of the communication game is received from another game apparatus by the communication means (32, 42, 64). The game resumption processing means (42, S43, S45, S47) resumes the game program (480*a*) using the retained parameter (482*b*). Thus, because the parameter necessary to execute the game program is stored in interrupting the communication game, the communication game can be resumed from the time point of the interruption.

In another aspect of the example embodiment, the game apparatus further comprises a communication stop means for stopping a process of the communication means when the game interruption mode is set by the game interruption mode setting means and, at the same time, when the communication game is interrupted, and a communication resumption means for resuming the process of the communication means when the game interruption mode is canceled by the game interruption mode cancellation means. Specifically, each game apparatus (10) further comprises a communication stop means (42, S25) and a communication resumption means (42, S35). The communication stop means (42, S25) stops a process of the communication means (32, 42, 64) when the game interruption mode is set by the game interruption mode setting means (42, S15, S17) and, at the same time, when the communication game is interrupted. The communication resumption means (42, S35) resumes the process of the communication means (32, 42, 64) when the game interruption mode is canceled by the game interruption mode cancellation means (42, S27, S29). Thus, the communication can be stopped or resumed by the predetermined operation.

In another embodiment of the example embodiment, the communication stop means does not stop the process of the communication means when the notification on the interruption of the communication game is received from another game apparatus. Specifically, the communication stop means (42, S25) does not stop the process of the communication means (32, 42, 64) when the notification on the interruption of the communication game is received from another game apparatus (10) ("YES" in S49). That is, when the communication game is interrupted by another game apparatus, the process of communication means is not stopped while the communication game of the game apparatus is interrupted, so that the game apparatus waits for another game apparatus in which the process of communication means is stopped to resume the communication. Therefore, when another game apparatus in which the process of communication means is stopped resumes the communication, another game apparatus can surely be connected again to continue the communication game.

In still another aspect of the example embodiment, the game apparatus further comprises a communicable state determination means for determining whether or not all other game apparatuses are in a communicable state when the game interruption mode is canceled by the game interruption mode cancellation means, a connection wait means for waiting for the all other game apparatuses to become the communicable state, when the communicable state determination means determines that any one of the other game apparatuses is not in the communicable state, and a parameter reading means for reading the parameter from the parameter storage means, when the communicable state determination means determines that the all other game apparatuses are in the communicable state. Specifically, the communicable state determination means (42, S39) determines whether or not all other game apparatuses (10) are in the communicable state, when the game interruption mode is canceled by the game interruption mode cancellation means (42, S27, S29). The connection wait means (42, S41) waits for the all other game apparatuses (10) to become the communicable state, when the communicable state determination means (42, S39) determines that any one of the other game apparatuses (10) is not in the communicable state ("NO" in S39). The parameter reading means (42, S45) reads the parameter from the parameter storage means (28*b*, 48), when the communicable state determination means (42, S39) determines that the all other game apparatuses (10) are in the communicable state ("YES" in S39). Thus, the connection wait means waits for the all other game apparatuses to become the communicable state, and the parameter reading means reads the stored parameter when all the game apparatuses become the communicable state, so that all the game apparatuses can resume the communication game from the time point of the interruption. That is, there is generated no trouble that a player of a part of the game apparatuses has the disadvantage.

In still another aspect of the example embodiment, the game apparatus further comprises an openable and closable housing and an opening and closing condition determination means for detecting an opening and closing condition of the housing, the game interruption mode setting means sets the game interruption mode when the opening and closing condition determination means determines that the housing is changed to a closed state, and the game interruption mode cancellation means cancels the game interruption mode when the opening and closing condition determination means determines that the housing is changed to an opened state. Specifically, the game apparatus (10) comprises an openable and closable housing (16 (16a, 16b)), and an opening and closing condition determination means (42, S13, S15, S27) determines the opening and closing condition of the housing (16). The game interruption mode setting means (42, S15, S17) sets the game interruption mode when the opening and closing condition determination means (42, S13, S15, S27) determines that the housing (16) is changed to the closed state, and the game interruption mode cancellation means (42, S27, S29) cancels the game interruption mode when the opening and closing condition determination means (42, S13, S15, S27) determines that the housing (16) is changed to the opened state. Thus, the interruption and resumption of the communication game can be directed by the opening and closing of the game apparatus, so that the operation is simple.

A game apparatus provided with a communication function according to the example embodiment presented herein comprises a program executing means, a communication means, a game interruption mode setting means, a game interruption mode notification means, a game interruption processing means, a game interruption mode cancellation means, and a game resumption processing means.

The program executing means executes a game program. The communication means performs communication with another game apparatus. The game interruption mode setting means sets a game interruption mode for interrupting the communication game according to an operation by a player. The game interruption mode notification means notifies another game apparatus of the interruption of the communication game using the communication means, when the game interruption mode is set by the game interruption mode setting means. The game interruption processing means interrupts the execution of the game program, when the communication game is interrupted by the setting of the game interruption mode, or when the notification on the interruption of the communication game is received from another game apparatus by the communication means. The game interruption mode cancellation means cancels the game interruption mode according to the operation of the player. The game interruption mode cancellation notification means notifies another game apparatus of the cancellation of the game interruption mode using the communication means, when the game interruption mode is canceled by the game interruption mode cancellation means. The game resumption processing means resumes the execution of the game program interrupted by the game interruption processing means, when the game interruption mode is canceled by the game interruption mode cancellation means, or when notification on the cancellation of the game interruption mode is received from another game apparatus by the communication means.

Also in this example embodiment, as with the above game system according to the example embodiment, the communication game can be resumed from the time point of the interruption.

In a storage medium according to the example embodiment presented herein, a game program of a game apparatus is stored. The game apparatus is provided with communication means for performing communication with at least another game apparatus. The game program causes a processor of the game apparatus to function as a game interruption mode setting means, a game interruption mode notification means, a game interruption processing means, a game interruption mode cancellation means, a game interruption mode cancellation notification means, and a game resumption processing means.

The game interruption mode setting means sets a game interruption mode for interrupting the communication game according to an operation by a player. The game interruption mode notification means notifies another game apparatus of the interruption of the communication game using the communication means, when the game interruption mode is set by the game interruption mode setting means. The game interruption processing means interrupts a game process, when the communication game is interrupted by the setting of the game interruption mode, or when the notification on the interruption of the communication game is received from another game apparatus by the communication means. The game interruption mode cancellation means cancels the game interruption mode according to the operation of the player. The game interruption mode cancellation notification means notifies another game apparatus of the cancellation of the game interruption mode using the communication means, when the game interruption mode is canceled by the game interruption mode cancellation means. The game resumption processing means resumes the game process interrupted by the game interruption processing means, when the game interruption mode is canceled by the game interruption mode cancellation means, or when notification on the cancellation of the game interruption mode is received from another game apparatus by the communication means.

Also in this example embodiment, as with the above game system according to the example embodiment, the communication game can be resumed from the time point of the interruption.

The above described features, aspects and advantages of the example embodiment presented herein will become more apparent from the following detailed description of the example embodiment when taken in conjunction with the accompanying drawings.

DETAILED DESCRIPTION OF THE PREFERRED EXAMPLE EMBODIMENTS

Figure 1:
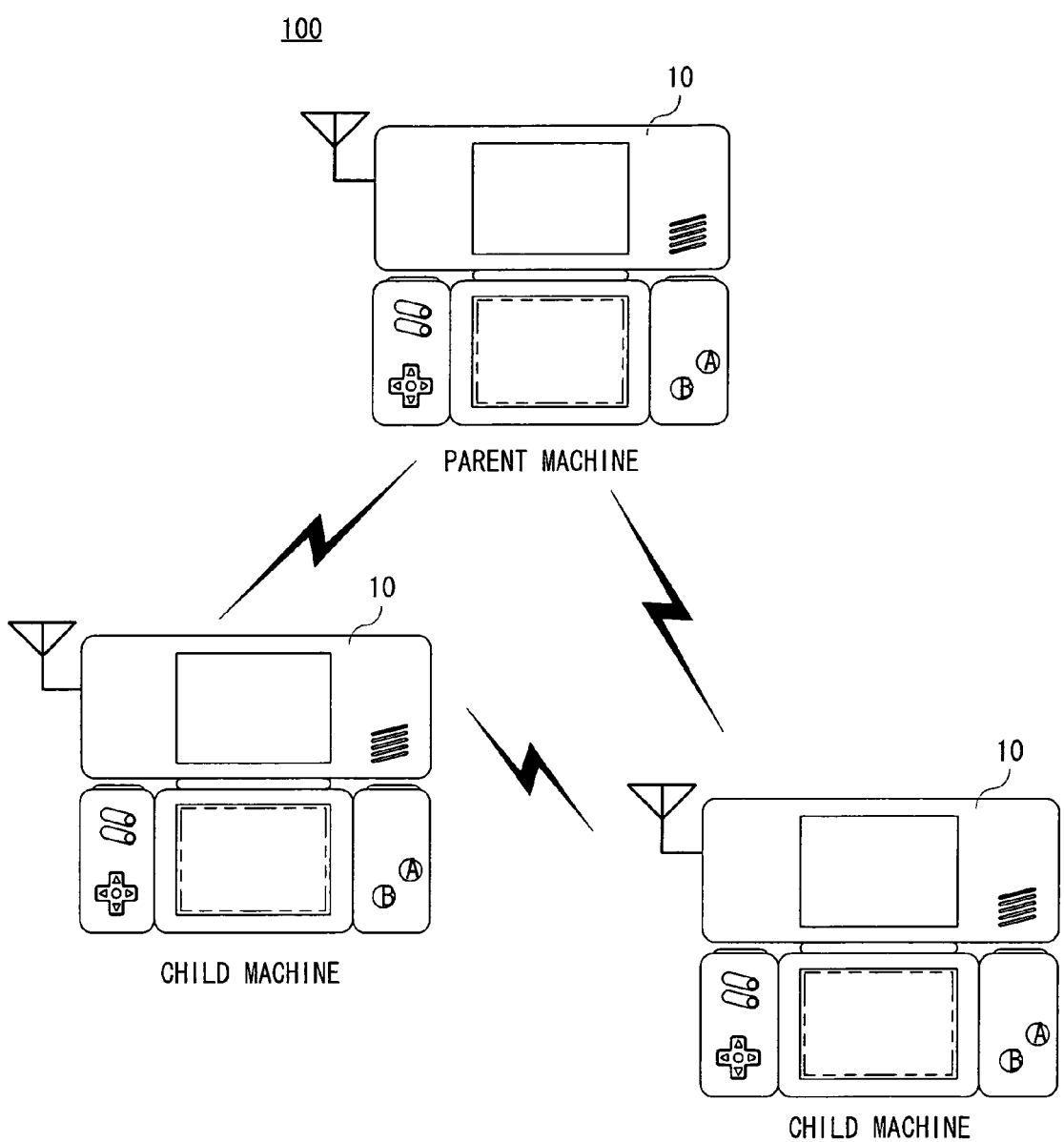
FIG. 1 is an illustrative view showing a game system according to an example embodiment.

Referring to FIG. 1, a game system (hereinafter simply referred to as "system") 100 as an embodiment includes plural game apparatuses 10. In FIG. 1, the system 100 is formed by the three game apparatuses 10. However, the system 100 may be formed by four or more game apparatuses 10 as long as not less than two. In the system 100, the plural game apparatuses 10 are communicably connected to one another (wireless communication in the embodiment), and one of the game apparatuses 10 is set as a parent machine and the other game apparatuses 10 are set as child machines.

There are various methods of determining the parent machine. For example, after the wireless communication is started, a first game apparatus 10 of which any button is operated can be determined as the parent machine. When the parent machine is determined, the other game apparatuses 10 are determined as child machines. However, in order to be able to identify the respective child machines, the parent machine allocates identification information or identification numbers to the respective child machines.

Figure 2:
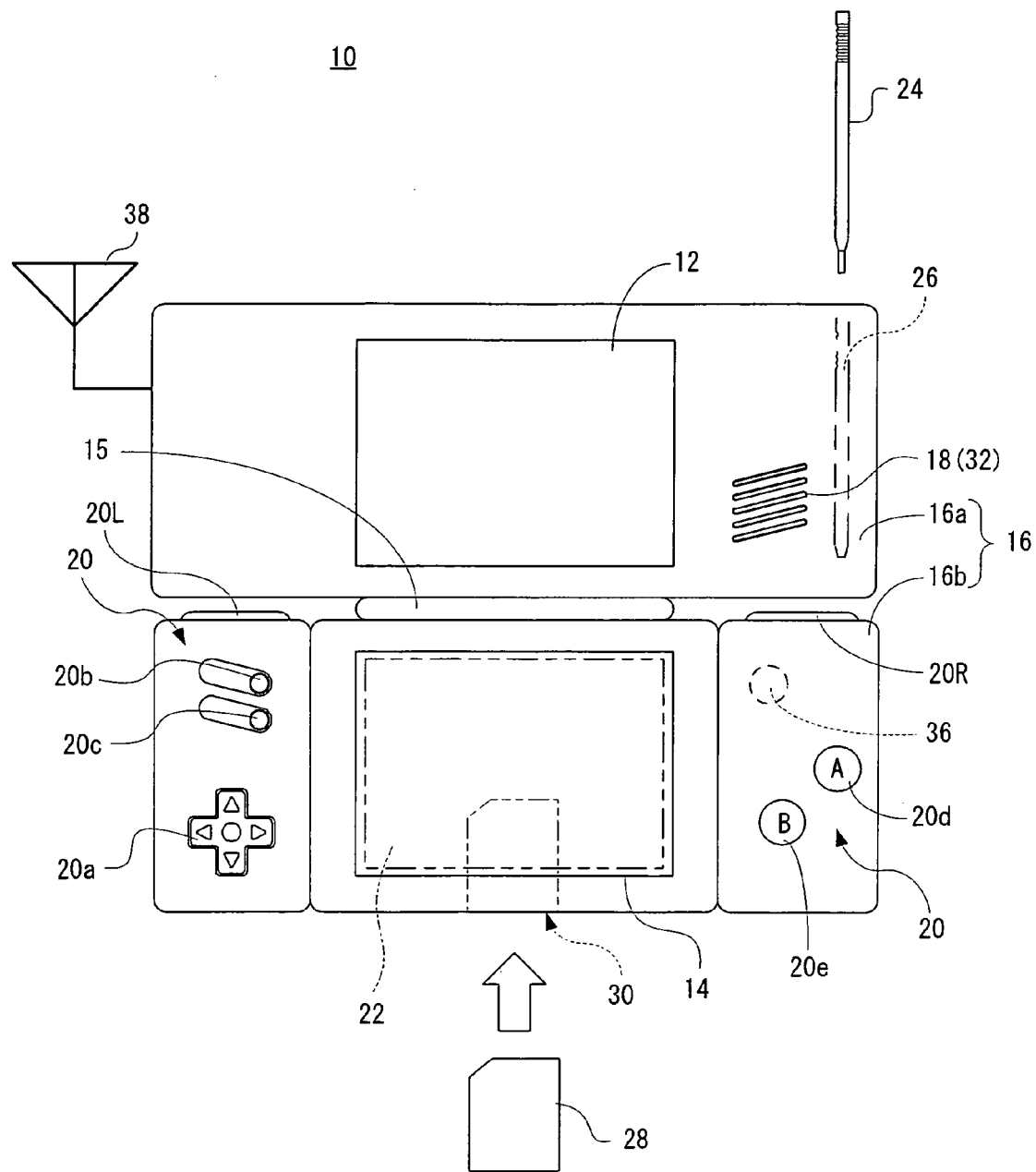
FIG. 2 is an illustrative view showing an example of the game-apparatus shown in an embodiment of FIG. 1.

FIG. 2 is an illustrative view showing an example of the game apparatus shown in FIG. 1. Referring to FIG. 2, the game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 2, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Then, on the lower housing 16b, a sound emission hole 18 is formed, and operating switches 20 (20a, 20b, 20c, 20d, 20e, 20L and 20R) are provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Noted that FIG. 1 and FIG. 2 show that the housing 16 (16a, 16b) is open. In that state, the player can play a game by using the game apparatus 10. However, in a state that the housing 16 (16a, 16b) is closed, a sleep mode is set as described later, and therefore, the player cannot play the game by using the game apparatus 10.

The operating switch 20 includes a direction instructing switch (cross switch) 20a, a start switch 20b, a select switch 20c, an action switch (A button) 20d, an action switch (B button) 20e, an action switch (L button) 22L, and an action switch (R button) 22R. The switch 20a, 20b, and 20c are arranged at the left of the LCD 14 on one surface of the lower housing 16b. Other switches 20d and 20e are arranged at the right of the LCD 14 on the one surface of the lower housing 16b. In addition, the switch 20L and the switch 20R are arranged at the right and left corners sandwiching the connected portion with the upper housing 16a on a part of the upper side surface (top surface) of the lower housing 16b.

The direction instructing switch 20a functions as a digital joystick, and is utilized for instructing a moving direction of a player character (or player object) to be operated by a player and instructing a moving direction of a cursor, and so forth by operating any one of four depression portions. Also, the start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, and so forth with a stick 24, a pen (stylus pen), or a finger (hereinafter, referred to as "stick or the like 24") on a top surface (detection surface) of the touch panel 22, the touch panel 22 detects a coordinates of an operated position of the stick or the like 24 to output coordinates data corresponding to the detected coordinates.

In this embodiment, a resolution of the display surface of the LCD 14 (the same is true for the LCD 12) is 256 dots×192 dots, and a detection accuracy of the detection surface of the touch panel 22 is also rendered 256 dots×192 dots in correspondence to the resolution of the display surface. However, the detection accuracy of the detection surface of the touch panel 22 may be lower than the resolution of the display surface of the LCD 14, or higher than it.

Different game images (game screens) can be displayed on the LCD 12 and the LCD 14. For example, on one of the LCD (LCD 12, for example), a game screen for playing the game is displayed, and on the other LCD (LCD 14, for example), a game screen (operation screen) for inputting text for operating the game, and instructing icons can be displayed. Accordingly, the player can input the textual (command) or instruct the icons (or predetermined images) on the screen of the LCD 14 by operating the touch panel 22 with the stick or the like 24.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Also, in this embodiment, the stick 24 can be housed in the housing portion (housing slot) 26 provided in the proximity to the side surface (right side surface) of the upper housing 16a, for example, and taken out as necessary. However, if the stick 24 is not provided, the housing portion 26 also needs not to be provided.

Furthermore, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other to allow a CPU core 42 (see FIG. 2) of the game apparatus 10 to become accessible to the memory card 28.

Moreover, the game apparatus 10 includes an antenna 34. By transmitting or receiving weak radio waves through the antenna 34, it is possible to carry out wireless communications with another game apparatus 10. Although a detailed description is omitted, the weak wave radios transmitted or received by the game apparatus 10 are set at a degree of strength that is permitted under the Radio Law.

Although not illustrated in FIG. 2, a speaker 32 (see FIG. 2) is provided in a position corresponding to the sound emission hole 18 inside the upper housing 16a. Furthermore, a Hall element (see FIG. 3) is provided inside the upper housing 16a, and placed at the upper right of the upper housing 16a, and at a position opposite to the sound emission hole 18 (strictly, speaker 32) when the game apparatus 10 is closed.

Furthermore although omitted in FIG. 2, a battery accommodating box is provided on a rear surface of the lower housing 16b, for example, and a power switch, a volume switch, an external expansion connector, an earphone jack, etc. are provided on a bottom surface of the lower housing 16b.

Figure 3:
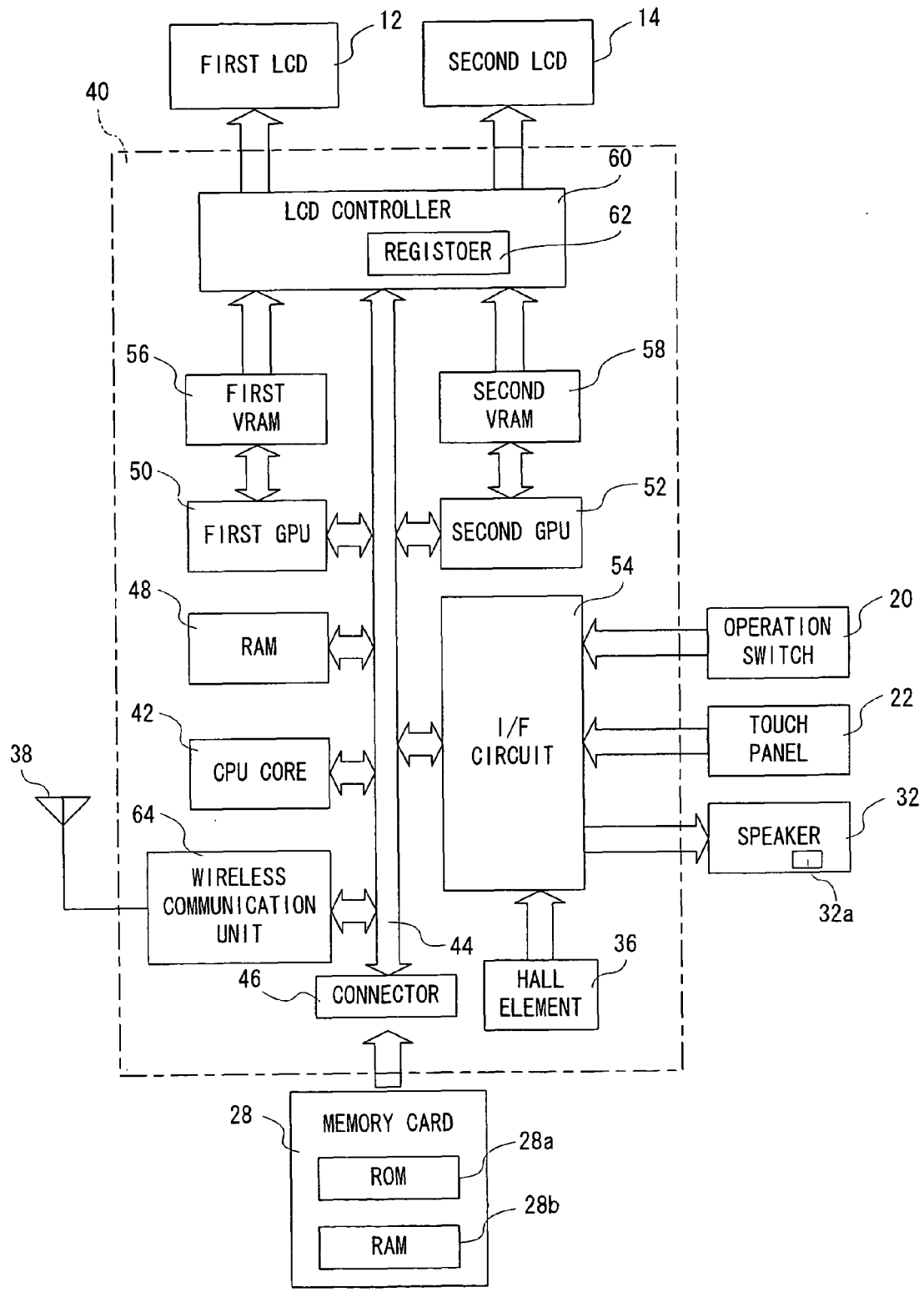
FIG. 3 is a block diagram showing an electric configuration of the game apparatus shown in FIG. 2.

FIG. 3 is a block diagram showing an electric configuration of the game apparatus 10. Referring to FIG. 3, the game apparatus 10 includes an electronic circuit board 40, and on the electronic circuit board 40, a circuit component such as a CPU core 42, etc. is mounted. The CPU core 42 is connected to the above-described connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28b stores (saves) proceeding data of the game, result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. Furthermore, the CPU core 42 executes a game process while storing data (game data, flag data) temporarily generated in correspondence with a progress of the game in the RAM 48.

Additionally, the game program, the image data, the sound data, etc. are stored (loaded) from the ROM 28a entirely at a time, or partially and sequentially so as to be stored into the RAM 48.

Each of the GPU 50 and the GPU 52 forms a part of a rendering means, is constructed by, for example, a single chip ASIC, and receives a graphics command from the CPU core 42 to generate game image data according to the graphics command. It should be noted that the CPU core 42 applies an image generation program (included in the game program) required to generate the game image data to both of the CPU 50 and GPU 52 in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. Also, the CPU core 42 writes image data necessary for rendering to the first VRAM 56 and the second VRAM 58 via the GPU 50 and the GPU 52. The GPU 50 accesses the VRAM 56 to create game image data for rendering, and the GPU 52 accesses the VRAM 58 to create game image data for rendering.

The VRAM 56 and the VRAM 58 are connected to the LCD controller 60. The LCD controller 60 includes a register 62, and the register 62 consists of, for example, one bit, and stores a value of "0" or "1" (data value) according to an instruction from the CPU core 42. The LCD controller 60 outputs the game image data created by the GPU 50 to the LCD 12, and outputs the game image data created by the GPU 52 to the LCD 14 in a case that the data value of the register 62 is "0". Also, the LCD controller 60 outputs the game image data created by the GPU 50 to the LCD 14, and outputs the game image data created by the GPU 52 to the LCD 12 in a case that the data value of the register 62 is "1".

Additionally, the LCD controller 60 directly reads the game image data from the VRAM 56 and the VRAM 58, or reads the image data from the VRAM 56 and the VRAM 58 via the GPU 50 and the GPU 52.

The I/F circuit 54 is connected with the operating switch 20, the touch panel 22, and the speakers 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates data output from the touch panel 22 is input to the CPU core 42 via the I/F circuit 54. In addition, the CPU core 42 reads from the RAM 48 the sound data necessary for the game, such as a game music (BGM), a sound effect or voices of a game character (onomatopoeic sound), etc., and outputs it from the speaker 32 via the I/F circuit 54. When the Hall element 36 detects magnetic flux of the magnet (in the embodiment, a magnet 32a around that a voice coil is wound in the speaker 32), the Hall element 36 outputs a voltage according to the magnetic flux. Numerical data according to the voltage is inputted to the CPU core 42. As described above, when the game apparatus 10 is closed by rotating the upper housing 16a, the Hall element 36 can detect the magnetic flux of the magnet 32a. That is, the CPU core 42 detects that the game apparatus 10 is closed (closed state) when the numerical data is inputted from the Hall element 36. On the other hand, the CPU core 42 detects that the game apparatus 10 is opened (opened state) when the numerical data is not inputted from the Hall element 36.

In the embodiment, the magnet 32a provided in the speaker 32 is adapted to be used to detect whether or not the game apparatus 10 is closed. Alternatively, a detection magnet may separately be provided.

As shown in FIG. 2, the antenna 38 is connected to the game apparatus 10, and the antenna 38 is connected to the wireless communication unit 64. The wireless communication unit 64 is connected to the CPU core 42 through the bus 44. When the CPU core 42 provides game data or a command to the wireless communication unit 64, the wireless communication unit 64 converts the game data, etc. into an analog signal and the wireless communication unit 64 transmits (sends) the analog signal in the form of a weak radio wave from the antenna 38. On the other hand, the wireless communication unit 64 receives the weak radio wave transmitted from another game apparatus 10 through the antenna 38, the wireless communication unit 64 separates the analog signal from the received weak radio wave to perform digital conversion to the analog signal, and the wireless communication unit 64 supplies the digital signal to the CPU core 42. Thus, the wireless communication is performed with other game apparatuses 10. Accordingly, in the system 100, the same virtual game (communication game) can be played while the wireless communication is performed among the game apparatuses 10.

Conventionally, in playing the communication game with plural game apparatuses, when one of the game apparatuses is left over a predetermined time to switch the game apparatus to the so-called sleep mode, the communication is disconnected to interrupt the currently playing communication game. In a case where the game apparatus is connected again, it is necessary that the plural game apparatuses start the communication game from the beginning. In order to avoid this problem, even if one of the game apparatuses is disconnected, the communication game is possibly continued with other game apparatuses except for the disconnected game apparatus. However, when the disconnected game apparatus is connected again, because the communication game is already proceeds, the player of the disconnected game apparatus had the disadvantage.

Therefore, in the configuration of the embodiment, each game apparatus 10 in the system 100 stores (saves) parameters (game data) necessary to execute the game program (strictly the later-mentioned game main processing program 480a), and interrupts the execution of the game main processing program (game processing) when interrupting the communication game, and the game apparatus 10 reads (loads) the saved parameters when being connected again to resume the communication game.

In simple terms, in the embodiment, when the game apparatus 10 (housing 16) is closed during playing the communication game, the state (closed state) of the game apparatus 10 is detected. That is, as described above, the Hall element 36 detects the magnetic flux of the magnet 32a provided in the speaker 32, and the Hall element 36 supplies the numerical data of the voltage to the CPU core 42 according to the magnetic flux, which allows the CPU core 42 to detect the closed state of the game apparatus 10. When the CPU core 42 detects the closed state, the CPU core 42 determines that the communication game is interrupted to set the game apparatus 10 to the sleep mode.

At this point, the other game apparatuses 10 are notified of the interruption of the communication game (communication) prior to the setting of the sleep mode. Specifically, in a case where the game apparatus 10 is the parent machine, the parent machine broadcasts the notification that communication game is interrupted to the child machines (other game apparatuses 10). In a case where the game apparatus 10 is the child machine, the child machine notifies the parent machine of the interruption of the communication game, and the parent machine notifies other child machines of the interruption of the communication game. The same holds for the following descriptions.

The sleep mode is set when all other game apparatuses 10 are notified of the interruption of the communication game. Prior to the setting of the sleep mode, the parameters (game data) necessary to execute a game main processing program 480a are saved in RAM 28b to interrupt the execution of the game main processing program 480a. As described above, this enables the communication game to be resumed from the time point of the interruption and this also enables the deletion of the game data due to the setting of the sleep mode to be prevented. Examples of the parameters (game data) include positional data of the player object, parameters (level, life, item, and the like) concerning the player object, and a flag concerning a game event, and so on. In the embodiment, when the sleep mode is set, the communication function is turned off. Alternatively, not only the communication function but functions (for example, display function) except for minimum circuit components, such as CPU core 42, the input device (operation switch 20 and touch panel 22) and the I/F circuit 54 may be turned off.

In the embodiment, when the sleep mode is set in any one of the game apparatuses 10, the communication game is interrupted in all the game apparatuses 10 constituting the system 10. However, the communication function is turned off only in the game apparatus 10 to which the sleep mode is set.

Accordingly, when one child machine sets the sleep mode, the child machine notifies the parent machine of the interruption of the communication game, and the parent machine notifies other child machines of the interruption of the communication game. The parent machine and other child machines wait for the child machine that sets the sleep mode to resume the communication game. Specifically, the parent machine notifies other child machines of the resumption of the communication game when the child machine that sets the sleep mode cancels the sleep mode to resume the communication game.

When the parent machine sets the sleep mode, the parent machine notifies all the child machines of the interruption of the communication game. The child machines wait for the parent machine that sets the sleep mode to resume the communication game. Specifically, the child machines search the parent machine that sets the sleep mode, and the parent machine notifies the child machines of the resumption of the communication game when the parent machine cancels the sleep mode.

For the resumption of the communication game, it is necessary that all the game apparatuses 10 are in a state where the communication game can be resumed.

In order to interrupt the communication game in own game apparatus 10, the game apparatus 10 that receives the notification on the interruption of the communication game saves the parameters in the RAM 28b to interrupt the execution of the game main processing program 480a.

Although the drawing is neglected, while one game apparatus 10 sets the sleep mode to interrupt the communication game a message of waiting for the communication game is displayed in other game apparatuses 10 to which the sleep mode is not set, and a message of selecting whether or not the communication game is ended is also displayed in other game apparatuses 10.

Specifically, when the child machine sets the sleep mode, the messages such as "waiting for everyone to come" and "touch "to top menu" when communication match-up is canceled" and a button image in which "to top menu" is displayed are displayed on the LCD 14 in the parent machine and other child machines.

When the parent machine sets the sleep mode, the messages such as "reconnecting, searching communication party" and "touch "to top menu" when communication match-up is canceled" and the button image in which "to top menu" is displayed are displayed on the LCD 14 in the child machines.

The communication game is ended, when the button image in which "to top menu" is displayed is specified (clicked).

During the setting of the sleep mode, when the game apparatus 10 (housing 16) is opened, because the Hall element 36 does not detect the magnetic flux of the magnet 32a in the speaker 32, the numerical data is not inputted to the CPU core 42 from the Hall element 36. This enables the CPU core 42 to detect the state (opened state) where the game apparatus 10 is opened. When the CPU core 42 detects the opened state, the CPU core 42 cancels the sleep mode. Specifically the CPU core 42 turns on the communication function. However, in a case where the functions (such as the display function) except for the communication function are turned off, the functions are also turned on.

When the sleep mode is canceled, a selection screen for selecting the resumption of the communication game or the end of the communication game is displayed on the LCD 14 (or LCD 12). Accordingly, the player can select the resumption of the communication game or the end of the communication game. When the player directs (selects) the resumption of the communication game, other game apparatuses 10 are notified of the resumption of the communication. Specifically, in a case where the game apparatus 10 is the parent machine, the parent machine broadcasts a notification of the resumption of the communication to the child machines. On the other hand, in a case where the game apparatus 10 is the child machine, the child machine notifies the parent machine of the resumption of the communication. At this point, in a case where the parent machine does not resume the communication yet, the child machine searches the parent machine at constant time intervals, and the child machine notifies the parent machine of the resumption of the communication at the time when the parent machine resumes the communication.

When the resumption of the communication game is directed, each game apparatus 10 determines whether or not all the game apparatuses 10 are in the communication state, i.e., whether or not the resumption of the communication game is directed. Specifically, in a case where the game apparatus 10 is the patent machine, the parent machine determines whether or not the resumption of the communication game is directed by itself, and the parent machine also determines whether or not the child machine notifies the parent machine of the resumption of the communication game. In a case where the game apparatus 10 is the child machine, the child machine determines whether or not the parent machine notifies the child machine of the resumption of the communication game. Thus, it is determined whether or not all the game apparatuses 10 are in the state (communicable state) where the communication game can be resumed.

When all the game apparatuses 10 are in the communication state, in each game apparatus 10, the saved parameters are read from RAM 28b and the parameters are loaded on RAM 48. At this point, a game program, image data, and the like that are stored in ROM 28a are also loaded on RAM 48. Thus, the communication game is resumed the time point of the interruption.

When the end of the communication is directed, the game apparatus 10 that receives the end direction directly ends the communication game.

In the embodiment, the parent machine detects whether or not each child machine directs the resumption of the communication game, and the parent machine notifies the child machines of the resumption of the communication game when all the game apparatuses 10 including the own game apparatus 10 direct the resumption of the communication game. The child machine resumes the communication game when receiving the notification from parent machine.

Figure 4:
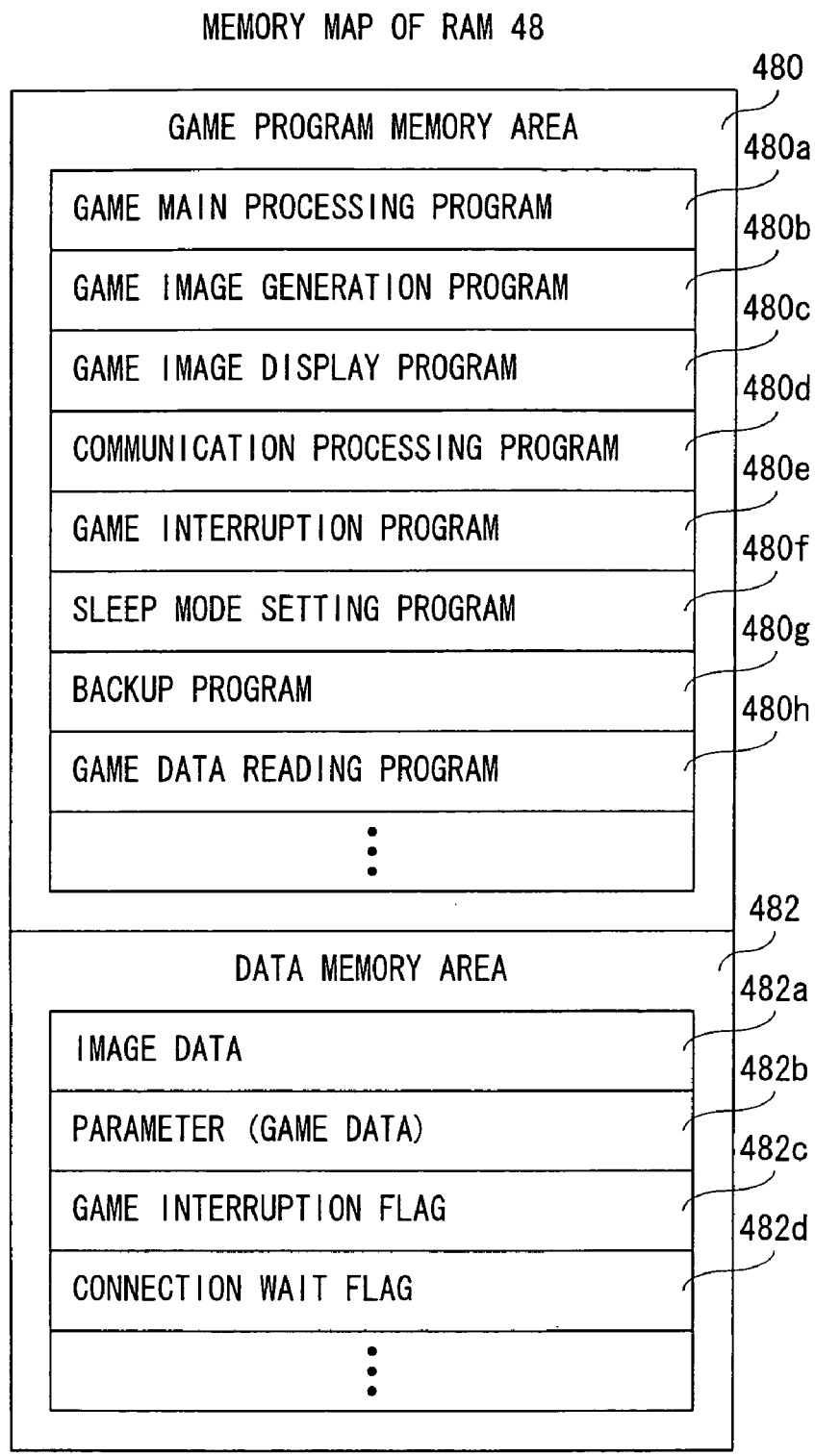
FIG. 4 is an illustrative view showing an example of a memory map of a RAM provided in the game apparatus shown in FIG. 3.

FIG. 4 shows a memory map of RAM 48. Referring to FIG. 4, RAM 48 includes a game program memory area 480 and a data memory area 482. A game program is stored in the game program memory area 480. The game program includes a game main processing program 480a, a game image generation program 480b, a game image display program 480c, a communication processing program 480d, a game interruption program 480e, a sleep mode setting program 480f, a backup program 480g, and parameters reading program 480h.

The game main processing program 480a is a program for processing a main routine of the communication game (virtual game) executed in the game apparatus 10. The game image generation program 480b is a program for generating the game image including the game object that appears in the communication game using the later-mentioned image data 482a. Examples of the game object include a player object whose action and the like are directed according to the operation (instruction) of the player, a non-player object (enemy object and the like) whose action and the like are directed according to not the operation of the player but the direction of the computer (CPU core 42), an item object, and a background object. The game image display program 480c is a program for displaying the game image generated according to the game image generation program 480b on the LCD 12 or the LCD 14.

The communication processing program 480d is a program for turning on and off the communication function (wireless communication unit 64) and for performing data communication with other game apparatuses 10 when the communication function is turned on. Alternatively, instead of the process of turning on and off the communication function, the CPU core 42 may start and stop the execution of the communication processing program 480d.

The game interruption program 480e is a program for interrupting the communication game. Specifically, when the sleep mode is set according to the later-mentioned sleep mode setting program 480f, other game apparatuses 10 are notified of the interruption of the communication game by executing the communication processing program 480d prior to the setting of the sleep mode. Then, a parameter 482b is stored in RAM 28b, and the execution of the game main processing program 480a is interrupted. When the notification that the communication game is interrupted is received from another game apparatus 10, in the own game apparatus 10, in order to interrupt the communication game, the parameter 482b is stored in RAM 28b, and the execution of the game main processing program 480a is interrupted.

The sleep mode setting program 480f is a program for setting the sleep mode when the housing 16 of the own game apparatus 10 is changed from the opened state to the closed state during the game (in the embodiment, during the communication game). However, as described above, the communication game is interrupted according to the game interruption program 480e prior to the setting of the sleep mode.

The backup program 480g is a program for saving the parameter 482b necessary for the execution of the game main processing program 480a in RAM 28b to interrupt the execution of the game main processing program 480a prior to the setting of the sleep mode. The parameters reading program 480h is a program for reading the parameter 482b saved in RAM 28b and for writing (loading) the parameter 482b in the data memory area 482 of the RAM 48, when the resumption of the communication game is directed after the sleep mode is canceled.

Although the drawing is neglected, a program for outputting sound necessary for the game, such as music (BGM), sound effects, and voice (imitative sound) of the player object, is also stored in the game program memory area 480.

The data such as the image data 482a and the parameter 482b are stored in the data memory area 482. The image data 482a is data (such as polygon data and texture data) for generating the game image such as the game object. The parameter 482b is parameters (game data) that are generated according to the progress of the game and necessary to execute the game main processing program 480a. As described above, examples of the parameters include the positional data of the player object, the parameters (such as a level, a life, and an item) concerning the player object, and the flag concerning the game event.

Flags such as a game interruption flag 482c and a connection wait flag 482d are also stored in the data memory area 482. The game interruption flag 482c is a flag for determining whether or not the communication game (or wireless communication) is interrupted. In the embodiment, the game interruption flag 482c is turned on (valid) and off (invalid) according to the game interruption program 480e. The game interruption flag 482c is formed by a one-bit register. A data value of "1" is set in the register when the game interruption flag 482c is established (turned on), and a data value of "0" is set in the register when the game interruption flag 482c is not established (turned off). The game interruption flag 482c is turned on when the communication game is interrupted, and the game interruption flag 482c is turned off when the communication game is executed.

The connection wait flag 482d is a flag for determining whether or not all other game apparatuses 10 cancel the sleep mode to wait for the communication game to be resumed, when the communication game is resumed. Similarly the connection wait flag 482d is formed by the one-bit register. A data value of "1" is set in the register when the connection wait flag 482d is established (turned on), and a data value of "0" is set in the register when the connection wait flag 482d is not established (turned off). The connection wait flag 482d is turned on, in a case where the own game apparatus 10 is communicable while the communication is interrupted (the sleep mode is set) in any one of the game apparatuses 10. On the other hand, the connection wait flag 482d is turned off, in a case where the own game apparatus 10 is communicable while all other game apparatuses 10 are also communicable (the sleep mode is canceled).

Although the drawing is neglected, other data such as sound (music) data are also stored in the data memory area 482, and other flags and registers that are necessary to execute the game main processing program 480a (necessary for the progress of the game) are also provided in the data memory area 482.

Figure 5:
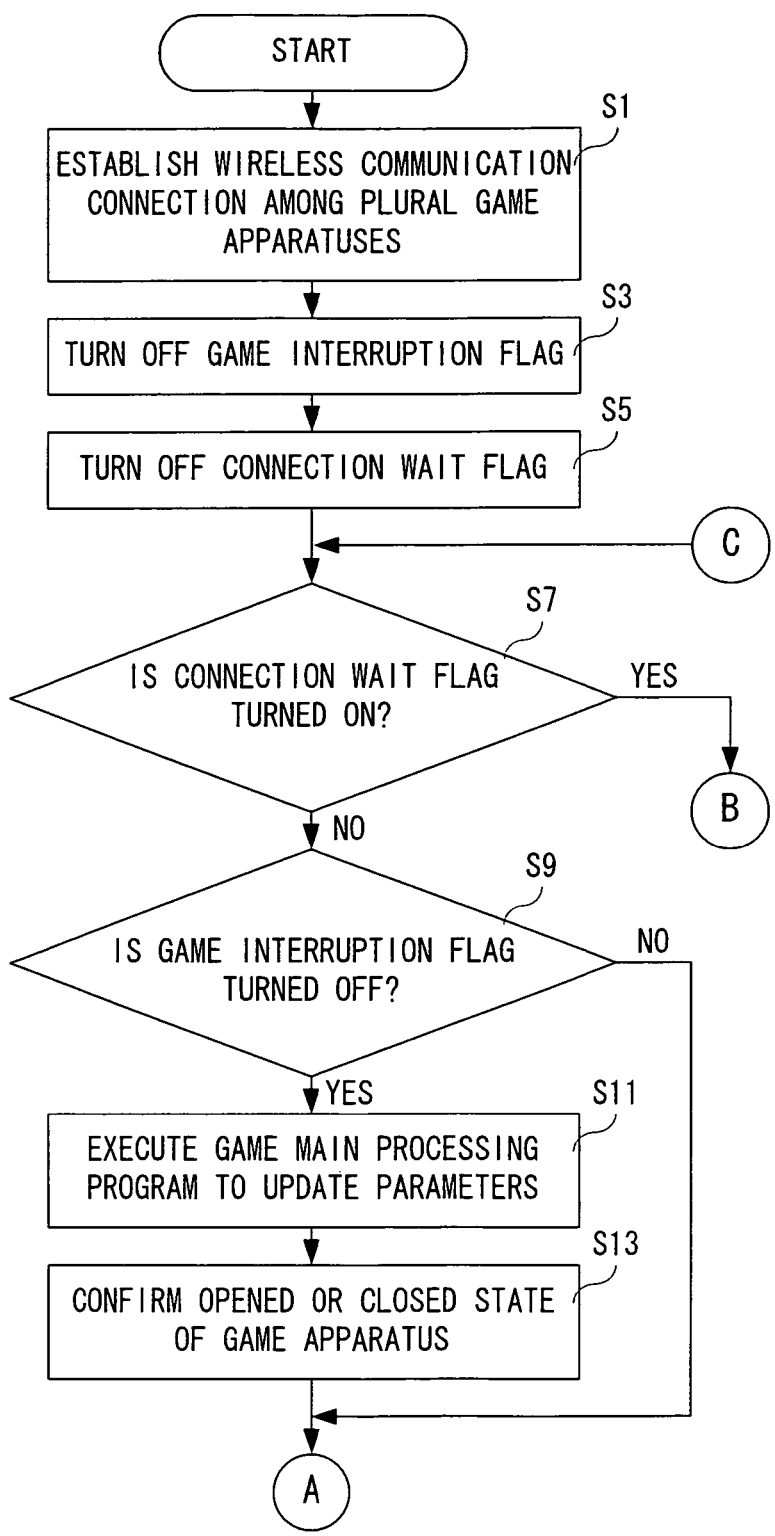
FIG. 5 is a flowchart showing a part of a communication game process of the CPU core shown in FIG. 3.

Specifically, the CPU core 42 shown in FIG. 3 performs a communication game process shown in FIGS. 5 to 8. As shown in FIG. 5, when the CPU core 42 starts the communication game process, the CPU core 42 establishes the wireless connection among the plural game apparatuses 10 in a step S1. Then, the game interruption flag 482c is turned off in a step S3, and the connection wait flag 482d is turned off in a step S5. In a step S7, it is determined whether or not the connection wait flag 482d is turned on. That is, the CPU core 42 determines whether or not at least one game apparatus 10 directs the resumption of the communication game.

In a case of "NO" in the step S7, namely, when the connection wait flag 482d is turned off, it is determined that the any game apparatus 10 does not wait for the connection of the communication game (communication). Then, in a step S9, it is determined whether or not the game interruption flag 482c is turned off. That is, the CPU core 42 determines whether or not the setting of the sleep mode is canceled in the own game apparatus 10. In a case of "NO" in the step S9, namely, when the game interruption flag 482c is turned on, it is determined that the setting of the sleep mode is not canceled in the own game apparatus 10. Then, the process moves to a step S15 shown in FIG. 6. On the other hand, in a case of "YES" in the step S9, namely, when the game interruption flag 482c is turned off, it is determined that the setting of the sleep mode is canceled in the own game apparatus 10. Then, the game main processing program 480a is executed to update the parameter 482b in a step S1. The opening and closing condition of the game apparatus 10 (own apparatus) is confirmed in a step S13, and then the process moves to the step S15. In the step S13, the CPU core 42 detects the presence or absence of the output from the Hall element 36.

Figure 6:
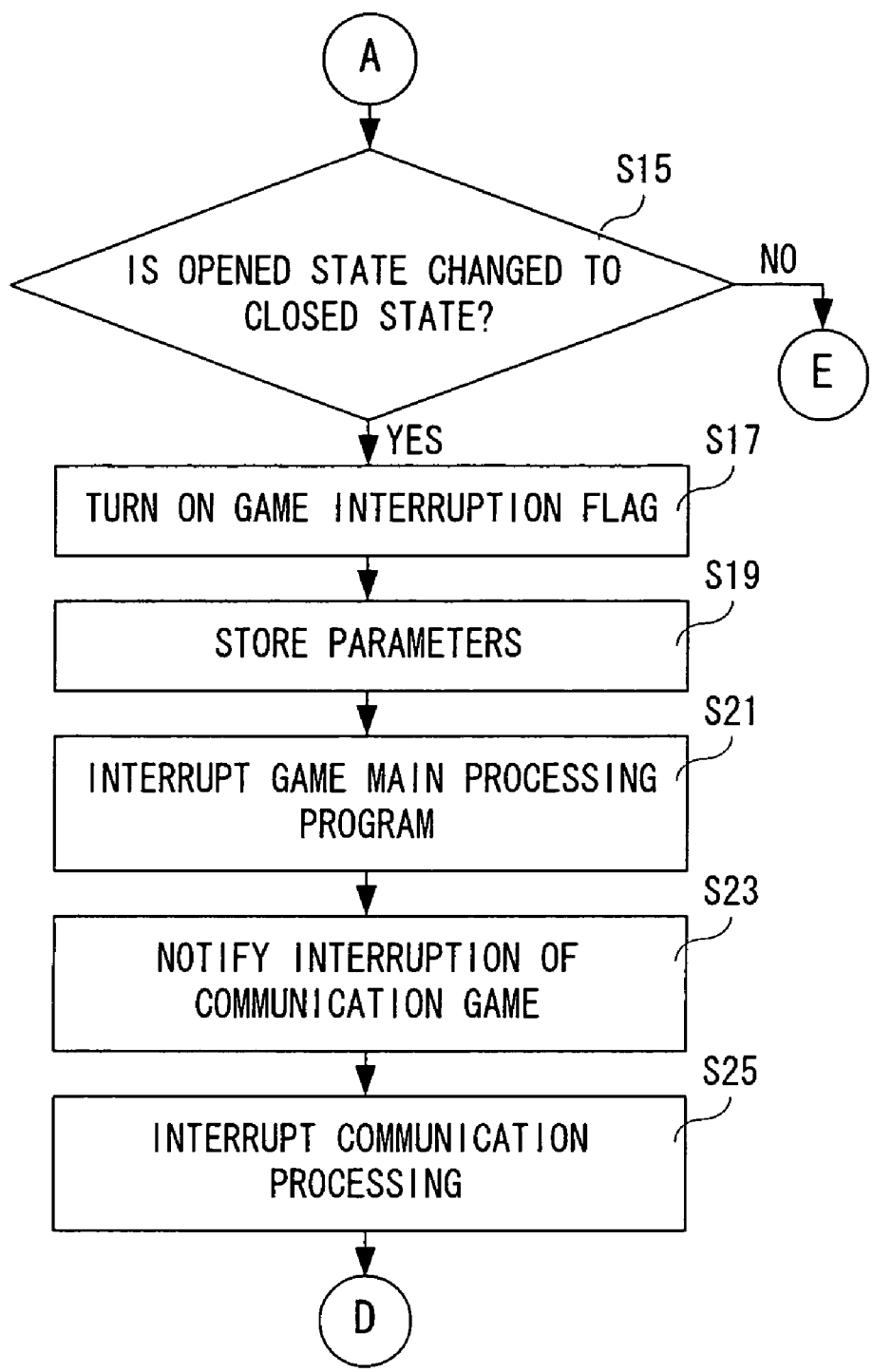
FIG. 6 is a flowchart showing another part of the communication game process of the CPU core shown in FIG. 3, and continued from FIG. 5.

In the step S15 shown in FIG. 6, it is determined whether or not the own apparatus is changed from the opened state to the closed state. In a case of "NO" in the step S15, namely, when the own apparatus is not changed from the opened state to the closed state, it is determined that the opened state or the closed state is kept in the own apparatus. Then, the process moves to a step S27 shown in FIG. 7. On the other hand, in a case of "YES" in the step S15, namely, when the own apparatus is changed from the opened state to the closed state, the game interruption flag 482c is turned on in a step S17. Then, in a step S19, the parameters are stored (saved) in the RAM 28b in order to set the sleep mode. The execution of the game main processing program 480a is interrupted in a step S21, and all other game apparatuses 10 are notified of the interruption of the communication game in a step S23. That is, the CPU core 42 makes the notification that communication (communication game) is interrupted through the wireless communication unit 64 and the antenna 38. The specific notification method is already described above, so that the overlapped description will be omitted. Then, the communication process is interrupted in a step S25, and then the process moves to a step S47 shown in FIG. 8. For example, in the step S25, electric power supply is stopped to the wireless communication unit 64, or the execution of the communication processing program 480d is interrupted (stopped).

Figure 7:
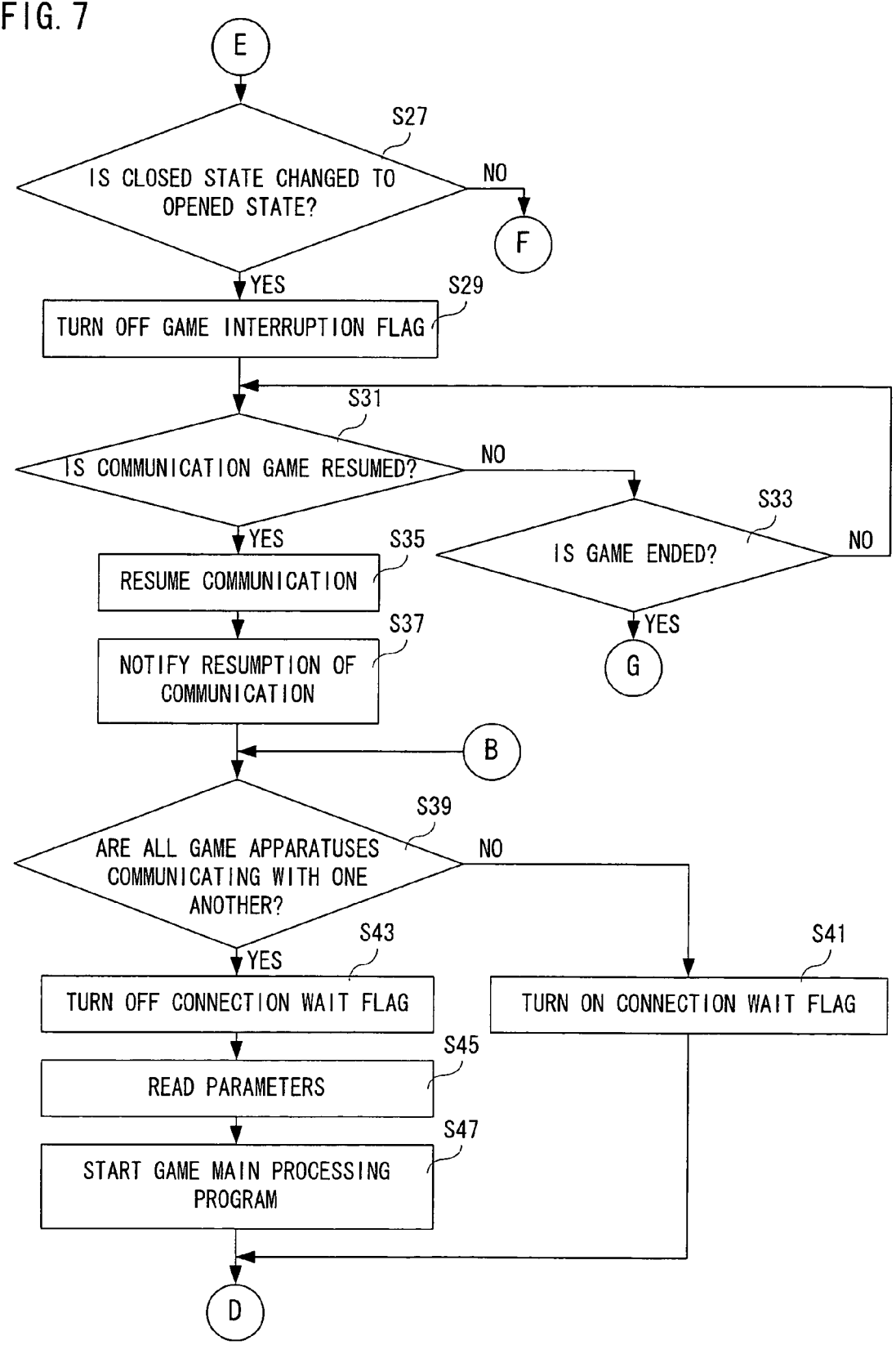
FIG. 7 is a flowchart showing still another part of the communication game process of the CPU core shown in FIG. 3, and continued from FIG. 5 and FIG. 6.

As described above, in a case of "NO" in the step S15, it is determined whether or not the own apparatus 10 is changed from the closed state to the opened state in the step S27 shown in FIG. 7. That is, it is determined whether or not the output of the Hall element 36 is changed from the present state to the absent state. In a case of "NO" in the step S27, namely, when the own apparatus 10 is not changed from the closed state to the opened state, it is determined that the closed state or the opened state is kept in the own apparatus 10, and then the process moves to a step S49 shown in FIG. 8. On the other hand, in a case of "YES" in the step S27, namely, when the own apparatus 10 is changed from the closed state to the opened state, the game interruption flag 482c is turned off in a step S29. Then, in a step S31, it is determined whether the communication game is resumed. Although the drawing is neglected, at this point, the selection screen for selecting the resumption of the communication game or the end of the communication game is displayed on the LCD 14 (or LCD 12) as described above, and the selection (direction) of the player is waited.

In a case of "NO" in the step S31, namely, when the communication is not resumed, it is determined whether or not the game is ended in a step S33. That is, it is determined whether or not the player selects the end of the communication game on the selection screen. In a case of "YES" in the step S33, namely, when the game is ended, and then the process moves to a step S55 shown in FIG. 8 in order to end the communication game. On the other hand, in a case of "NO" in the step S33, namely, when the game is not ended, and then the process returns to the step S31, and the direction (selection) of the resumption of the communication game or the end of the communication game is waited.

In a case of "YES" in the step S31, namely, when the communication game is resumed, the communication is resumed in the step S35. That is, the CPU core 42 starts the supply of the electric power to the wireless communication unit 64 or the execution of the communication processing program 480d. In a step S37, other game apparatuses 10 are notified of the communication resumption. That is, the CPU core 42 makes the notification that the communication is resumed through the wireless communication unit 64 and the antenna 38.

In a step S39, it is determined whether or not all the game apparatuses 10 are in the communication state, namely, whether or not the resumption of the communication game is directed in all the game apparatuses 10. The determination method is already described above, so that the overlapped description will be omitted. In a case of "NO" in the step S39, namely, when the game apparatus 10 that is not in the communication state exists, the connection wait flag 482d is turned on in a step S41, and then the process moves to a step S53 shown in FIG. 8. However, when the connection wait flag 482d is already turned on, the CPU core 42 does not perform the process of the step S41, and then the process directly moves to the step S53. On the other hand, in a case of "YES" in the step S39, namely, when all the game apparatuses 10 are in the communication state, the connection wait flag 482d is turned off in a step S43. In order to resume the communication game, the parameters is read in a step S45, the game main processing program 480a is started in the step S47, and then the process moves to the step S53. In the step S45, the parameters are read from the RAM 28b, and the CPU core 42 writes (loads) the parameters in the data memory area 482 of the RAM 48.

Figure 8:
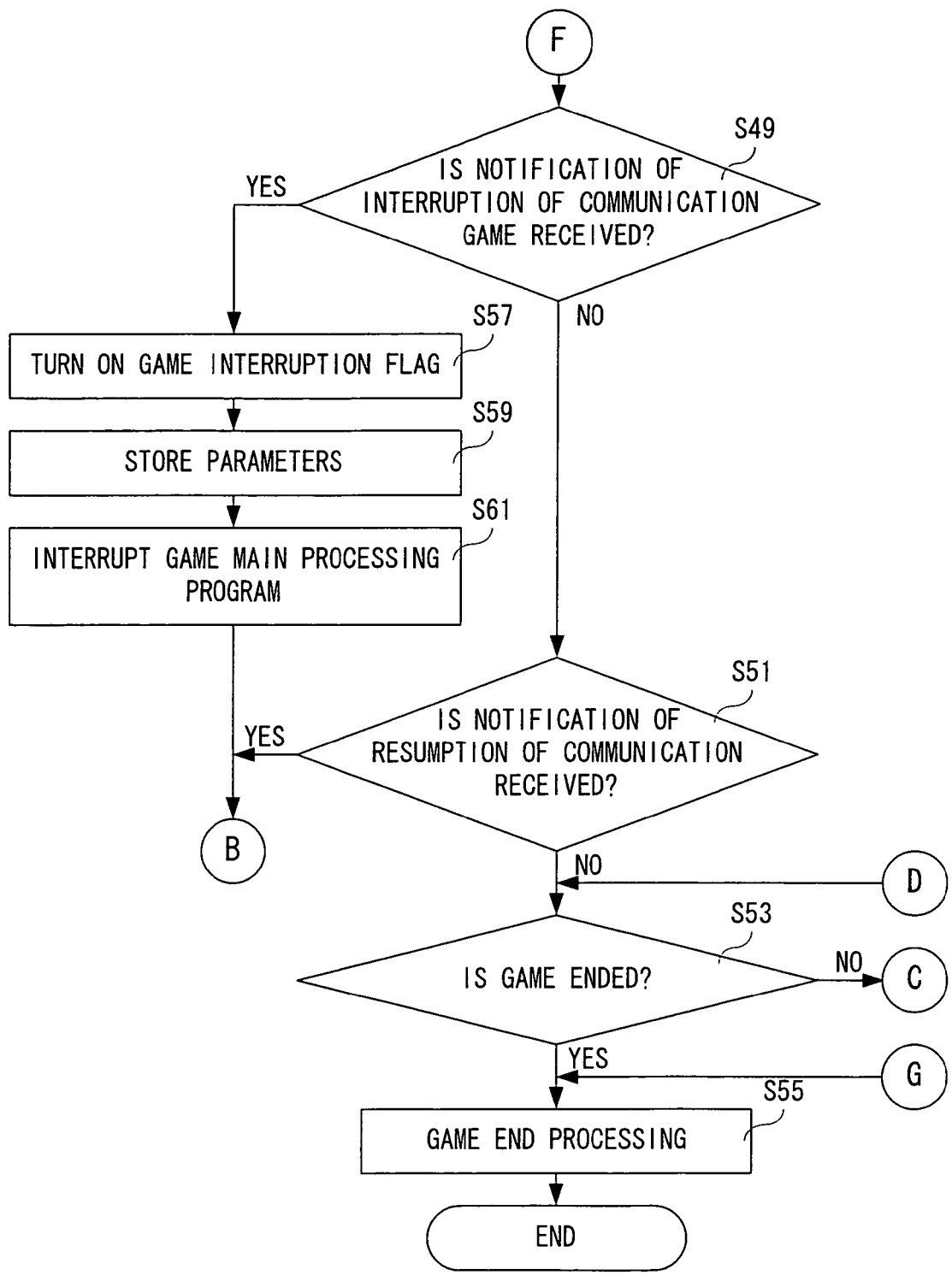
FIG. 8 is a flowchart showing still another part of the communication game process of the CPU core shown in FIG. 3, and continued from FIGS. 5 to 7.

As described above, in a case of "NO" in the step S27, it is determined whether or not the notification that the communication game is interrupted is received from another game apparatus 10 in the step S49 shown in FIG. 8. In a case of "YES" in the step S49, namely, when the notification that the communication game is interrupted is received, in order to interrupt the communication game, the game interruption flag 482c is turned on in a step S57, the parameters is stored in the RAM 28b in a step S59, and the execution of the game main processing program 480a is interrupted in a step S61. Then, the process returns to the step S39 shown in FIG. 7. On the other hand, in a case of "NO" in the step S49, namely, when the notification that the communication game is interrupted is not received, it is determined whether or not the notification on the communication resumption is received in the step S51.

In a case of "YES" in the step S51, namely, when the notification on the communication resumption is received, the process returns to the step S39 shown in FIG. 7. On the other hand, in a case of "NO" in the step S51, namely, when the notification on the communication resumption is not received, and then the process moves to the step S53.

In the flowchart of the communication game process shown in FIGS. 5 to 8, when the notification on the communication resumption is received, the process is adapted to return to the step S39 regardless of whether the game apparatus 10 is the parent machine or the child machine. In a case where the game apparatus 10 is the child machine, the parent machine notifies the child machine of the communication resumption. This shows that all the game apparatuses 10 are in the communication state, so that the CPU core 42 always determines "YES" in the step S39. In a case where the game apparatus 10 is the parent machine, because the child machine notifies the parent machine of the communication resumption, it is determined whether or not all the game apparatuses 10 (in this case, all the child machines) are in the communication state in the step S39.

In the step S53, it is determined whether or not the game is ended. In this case, it is determined whether or not the direction of the game end is inputted by the player or it is determined whether or not the game is over. In a case of "NO" in the step S53, namely, when the game is not ended, the process returns to the step S7 shown in FIG. 5. In a case of "YES" in the step S53, namely, when the game is ended, the game end process is performed in the step 555 to end the communication game process. For example, in the step S55, the CPU core 42 displays a game initial screen after saving the parameters.

According to the embodiment, when the communication game is interrupted in one game apparatus, the other game apparatuses are notified of the interruption of the communication game, and the communication game is also interrupted in other game apparatuses. When one game apparatus directs the resumption of the interrupted communication game, the other the game apparatuses are notified of the resumption of the communication game, and the communication game is also resumed in other game apparatuses. Therefore, the communication game can be resumed from the time point of the interruption.

In the embodiment, in interrupting the communication game, the execution of the game main processing program is interrupted while the parameters are saved, so that the parameters can be prevented from losing at the time when the game is interrupted. Furthermore, the saved parameters are read in resuming the communication game, which allows the communication game to be surely resumed from the time point of the interruption.

In the embodiment, the openable and closable game apparatus is used to set or cancel the sleep mode according to the opening and closing condition. However, the invention is not limited to the embodiment, but the sleep mode may be set or canceled by the switch operation of the player.

In the embodiment, the system is formed by the game apparatuses in that the display device is integrated. However, the invention can be applied to the case where the system is formed by the game apparatuses in that the display device is separately provided.

In the embodiment, the game apparatuses are connected to one another through the wireless communication. However, the invention is not limited to the embodiment, and the game apparatuses may be connected to one another with cables or the game apparatuses may be connected to one another through the Internet.

The configuration of the game apparatus should not be limited to the configuration shown in the embodiment. For example, one LCD may be used, or the touch panel may be provided in each of the two LCDs. Moreover, the speakers may be provided on the right and left sides.

Although the example embodiment presented herein has been described and illustrated in detail, it is clearly understood that the same is by way of illustration and example only and is not to be taken by way of limitation, the spirit and scope of the example embodiment being limited only by the terms of the appended claims.

What is claimed is:

1. A game system for playing a communication game by at least two game apparatuses having communication functions, each of said game apparatuses comprising:
    program executing programmed logic circuitry for executing a game program;
    a communication element for performing communication with another game apparatus;
    game interruption mode setting programmed logic circuitry for setting a game interruption mode for interrupting said communication game according to an operation by a player;
    game interruption mode notification programmed logic circuitry for notifying said another game apparatus of the interruption of said communication game using said communication element, when the game interruption mode is set by said game interruption mode setting programmed logic circuitry;
    game interruption processing programmed logic circuitry for interrupting the execution of said game program, when said communication game is interrupted by the setting of said game interruption mode setting programmed logic circuitry, or when the notification on the interruption of said communication game is received from said another game apparatus by said communication element;
    game interruption mode cancellation programmed logic circuitry for canceling said game interruption mode according to the operation of the player;
    game interruption mode cancellation notification programmed logic circuitry for notifying said another game apparatus of the cancellation of the game interruption mode using said communication element, when the game interruption mode is canceled by said game interruption mode cancellation programmed logic circuitry; and
    game resumption processing programmed logic circuitry for resuming the execution of said game program interrupted by said game interruption processing, programmed logic circuitry when the game interruption mode is canceled by said game interruption mode cancellation programmed logic circuitry, or when notification on the cancellation of the game interruption mode is received from said another game apparatus by said communication element, wherein
    said game interruption processing programmed logic circuitry interrupts the execution of said game program after notification on the interruption of said communication game is sent to said another game apparatus by said communication element.

2. A game system according to claim 1, wherein
    said game interruption processing programmed logic circuitry automatically interrupts the execution of said game program, when the notification on the interruption of said communication game is received from said another game apparatus by said communication element.

3. A game system according to claim 1, wherein
    said game apparatus further comprises parameter storage locations for storing a parameter necessary to execute said game program,
    said program executing programmed logic circuitry executes said game program using said parameter stored in said parameter storage locations,
    said parameter storage locations retain said parameter, when said game interruption mode setting programmed logic circuitry sets said game interruption mode to interrupt said communication game, or when the notification on the interruption of said communication game is received from said another game apparatus by said communication element, and
    said game resumption processing programmed logic circuitry resumes said game program using said retained parameter.

4. A game system according to claim 1, wherein said game apparatus further comprises:
    communication stop programmed logic circuitry for stopping a process of said communication element when the game interruption mode is set by said game interruption mode setting programmed logic circuitry and, at the same time, when said communication game is interrupted, and
    communication resumption programmed logic circuitry for resuming the process of said communication element when the game interruption mode is canceled by said game interruption mode cancellation programmed logic circuitry.

5. A game system according to claim 4, wherein
    said communication stop programmed logic circuitry does not stop the process of said communication element when the notification on the interruption of said communication game is received from said another game apparatus.

6. A game system according to claim 3, wherein
    said game apparatus further comprises:
    communicable state determination programmed logic circuitry for determining whether or not all other game apparatuses are in a communicable state when said game interruption mode is canceled by said game interruption mode cancellation programmed logic circuitry;

connection wait programmed logic circuitry for waiting for said all other game apparatuses to be in the communicable state, when said communicable state determination programmed logic circuitry determines that any one of said other game apparatuses is not in the communicable state; and parameter reading programmed logic circuitry for reading said parameter from said parameter storage locations, when said communicable state determination programmed logic circuitry determines that said all other game apparatuses are in the communicable state.

7. A game system according to claim 1, wherein said game apparatus further comprises an openable and closable housing and an opening and closing condition determination programmed logic circuitry for detecting an opening and closing condition of said housing, wherein said game interruption mode setting programmed logic circuitry sets said game interruption mode when said opening and closing condition determination programmed logic circuitry determines that said housing is changed to a closed state, and said game interruption mode cancellation programmed logic circuitry cancels said game interruption mode when said opening and closing condition determination programmed logic circuitry determines that said housing is changed to an opened state.

8. A game apparatus provided with a communication function, comprising:

program executing programmed logic circuitry for executing a game program;

a communication element for performing communication with another game apparatus;

game interruption mode setting programmed logic circuitry for setting a game interruption mode for interrupting said communication game according to an operation by a player;

game interruption mode notification programmed logic circuitry for notifying said another game apparatus of the interruption of said communication game using said communication element, when the game interruption mode is set by said game interruption mode setting programmed logic circuitry;

game interruption processing programmed logic circuitry for interrupting the execution of said game program, when said communication game is interrupted by the setting of said game interruption mode setting programmed logic circuitry, or when the notification on the interruption of said communication game is received from said another game apparatus by said communication element;

game interruption mode cancellation programmed logic circuitry for canceling said game interruption mode according to the operation of the player;

game interruption mode cancellation notification programmed logic circuitry for notifying said another game apparatus of the cancellation of the game interruption mode using said communication element, when the game interruption mode is canceled by said game interruption mode cancellation programmed logic circuitry; and game resumption processing programmed logic circuitry for resuming the execution of said game program interrupted by said game interruption processing programmed logic circuitry, when the game interruption mode is canceled by said game interruption mode cancellation programmed logic circuitry, or when notification on the cancellation of the game interruption mode is received from said another game apparatus by said communication element, wherein said game interruption processing programmed logic circuitry interrupts the execution of said game program after notification on the interruption of said communication game is sent to said another game apparatus by said communication element.

9. A game apparatus according to claim 8, wherein said game interruption processing programmed logic circuitry automatically interrupts the execution of said game program, when the notification on the interruption of said communication game is received from said another game apparatus by said communication element.

10. A game apparatus according to claim 8, further comprising:

parameter storage locations for storing a parameter necessary to execute said game program, wherein said program executing programmed logic circuitry executes said game program using said parameter stored in said parameter storage locations, said parameter storage locations, retain said parameter, when said game interruption mode setting programmed logic circuitry sets said game interruption mode to interrupt said communication game, or when the notification on the interruption of said communication game is received from said another game apparatus by said communication element, and said game resumption processing programmed logic circuitry resumes said game program using said retained parameter.

11. A game apparatus according to claim 8, further comprising:

communication stop programmed logic circuitry for stopping a process of said communication element when the game interruption mode is set by said game interruption mode setting programmed logic circuitry and, at the same time, when said communication game is interrupted, and communication resumption programmed logic circuitry for resuming the process of said communication element when the game interruption mode is canceled by said game interruption mode cancellation programmed logic circuitry.

12. A game apparatus according to claim 11, wherein said communication stop programmed logic circuitry does not stop the process of said communication element when the notification on the interruption of said communication game is received from said another game apparatus.

13. A game apparatus according to claim 10, further comprising:

communicable state determination programmed logic circuitry for determining whether or not all other game apparatuses are in a communicable state when said game interruption mode is canceled by said game interruption mode cancellation programmed logic circuitry;

connection wait programmed logic circuitry for waiting for said all other game apparatuses to be in the communicable state, when said communicable state determination programmed logic circuitry determines that any one of said other game apparatuses is not in the communicable state; and parameter reading programmed logic circuitry for reading said parameter from said parameter storage locations, when said communicable state determination programmed logic circuitry determines that said all other game apparatuses are in the communicable state.

14. A game apparatus according to claim 8, further comprising:
an openable and closable housing; and
opening and closing condition determination programmed logic circuitry for detecting an opening and closing condition of said housing, wherein
said game interruption mode setting programmed logic circuitry sets said game interruption mode when said opening and closing condition determination programmed logic circuitry determines that said housing is changed to a closed state, and
said game interruption mode cancellation programmed logic circuitry cancels said game interruption mode when said opening and closing condition determination programmed logic circuitry determines that said housing is changed to an opened state.

15. A storage medium storing a game program of a game apparatus, the game apparatus being provided with a communication element for performing communication with at least another game apparatus, the game program causes a processor of said game apparatus to function as:
game interruption mode setting programmed logic circuitry for setting a game interruption mode for interrupting said communication game according to an operation by a player;
game interruption mode notification programmed logic circuitry for notifying said another game apparatus of the interruption of said communication game using said communication element, when the game interruption mode is set by said game interruption mode setting programmed logic circuitry;
game interruption processing programmed logic circuitry for interrupting a game process, when said communication game is interrupted by the setting of said game interruption mode setting programmed logic circuitry, or when the notification on the interruption of said communication game is received from said another game apparatus by said communication element;
game interruption mode cancellation programmed logic circuitry for canceling said game interruption mode according to the operation of the player;
game interruption mode cancellation notification programmed logic circuitry for notifying said another game apparatus of the cancellation of the game interruption mode using said communication element, when the game interruption mode is canceled by said game interruption mode cancellation programmed logic circuitry; and
game resumption processing programmed logic circuitry for resuming said game process interrupted by said game interruption processing programmed logic circuitry, when the game interruption mode is canceled by said game interruption mode cancellation programmed logic circuitry, or when notification on the cancellation of the game interruption mode is received from said another game apparatus by said communication element, wherein
said game interruption processing programmed logic circuitry interrupts the execution of said game program after notification on the interruption of said communication game is sent to said another apparatus by said communication element.

16. A storage medium storing a game program according to claim 15, wherein said game interruption processing programmed logic circuitry automatically interrupts said game process, when the notification on the interruption of said communication game is received from said another game apparatus by said communication element.

17. A storage medium storing a game program according to claim 15, wherein
said game apparatus further comprises parameter storage locations for storing a parameter necessary to execute said game program,
said processor executes said game process using said parameter stored in said parameter storage locations,
said parameter storage locations retains retain said parameter, when said game interruption mode setting programmed logic circuitry sets said game interruption mode to interrupt said communication game, or when the notification on the interruption of said communication game is received from said another game apparatus by said communication element, and
said game resumption processing programmed logic circuitry resumes said game process using said retained parameter.

18. A storage medium storing a game program according to claim 15, wherein said game program causes said processor to further function as:
communication stop programmed logic circuitry for stopping a process of said communication element when the game interruption mode is set by said game interruption mode setting programmed logic circuitry and, at the same time, when said communication game is interrupted, and
communication resumption programmed logic circuitry for resuming the process of said communication element when the game interruption mode is canceled by said game interruption mode cancellation programmed logic circuitry.

19. A storage medium storing a game program according to claim 18, wherein
said communication stop programmed logic circuitry does not stop the process of said communication element when the notification on the interruption of said communication game is received from said another game apparatus.

20. A storage medium storing a game program according to claim 17, wherein said game program causes said processor to further function as:
communicable state determination programmed logic circuitry for determining whether or not all other game apparatuses are in a communicable state when said game interruption mode is canceled by said game interruption mode cancellation programmed logic circuitry;
connection wait programmed logic circuitry for waiting for said all other game apparatuses to be in the communicable state, when said communicable state determination programmed logic circuitry determines that any one of said other game apparatuses is not in the communicable state; and
parameter reading programmed logic circuitry for reading said parameter from said parameter storage locations, when said communicable state determination programmed logic circuitry determines that said all other game apparatuses are in the communicable state.

21. A storage medium storing a game program according to claim 15,
wherein said game apparatus further comprises an openable and closable housing and opening and closing condition determination programmed logic circuitry for detecting an opening and closing condition of said housing, wherein said game interruption mode setting programmed logic circuitry sets said game interruption mode when said opening and closing condition determination programmed logic circuitry determines that said housing is changed to a closed state, and said game interruption mode cancellation programmed logic circuitry cancels said game interruption mode when said opening and closing condition determination programmed logic circuitry determines that said housing is changed to an opened state.

* * * * *